3,036,115
DIALKYLAMINOOXAPENTYL CARBANILATES
Kurt J. Rorig, Glenview, Ill., assignor to G. D. Searle & Co., Chicago, Ill., a corporation of Delaware
No Drawing. Filed May 11, 1959, Ser. No. 812,116
7 Claims. (Cl. 260—472)

This invention relates to 5-dialkylamino-3-oxapentyl carbanilates and a process for the manufacture thereof. More particularly, this invention relates to compounds of the formula

R—NHCOOCH$_2$CH$_2$OCH$_2$CH$_2$—Z wherein R represents a phenyl radical substituted by one or more halogen and/or alkoxy radicals, and Z represents a dialkylamino radical.

Among the substituted phenyl radicals represented by R, particularly those wherein the constituent halogen is chlorine and the alkoxy groupings of lower order, are preferred. Likewise lower alkyl groupings are substituents of choice in the amino radical, Z. By lower alkoxy and lower alkyl groupings those skilled in the art will understand methoxy, ethoxy, propoxy, isopropoxy, butoxy, isobutoxy, sec-butoxy, tert-butoxy, pentoxy, isopentoxy, tert-pentoxy, neopentoxy, hexoxy, isohexoxy, heptoxy, octoxy, etc., and corresponding radicals differing solely in the absence of the oxygen atom, respectively.

Equivalent to the foregoing basic esters for purposes of this invention are non-toxic acid addition and quaternary ammonium salts thereof, the compositions of which can be formulated

R—NHCOOCH$_2$CH$_2$OCH$_2$CH$_2$—Z.QX wherein R and Z have the meanings hereinbefore assigned; Q is selected from among hydrogen and lower alkyl, hydroxy (lower alkyl), and lower alkenyl radicals, as also such aralkyl radicals as benzyl, phenethyl, and naphthylmethyl; and X is one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in pharmaceutical dosage.

The compounds to which this invention relates are useful because of their valuable pharmacological properties. Thus, for example, they are eurhythmic agents, and specifically 5-diethylamino-3-oxapentyl p-chlorocarbanilate is, additionally, diuretic.

Manufacture of the subject compositions proceeds by heating an isocyanate of the formula

R—NCO with an amino alcohol of the formula

HOCH$_2$CH$_2$OCH$_2$CH$_2$—Z (R and Z being defined as before) in the presence of an inert solvent. Such solvents include acetone, butanone, dichloromethane, chloroform, ether, benzene, xylene, and any other liquid media impervious to interaction with the aforesaid isocyanates and amino alcohols under the reaction conditions imposed.

Conversion of the basic esters of this invention to corresponding acid addition salts is accomplished by simple admixture of these compounds with any of various inorganic or strong organic acids, the anionic portion of which conforms to X as hereinabove defined.

The quarternary ammonium compounds comprehended by this invention are those derived by contacting a claimed basic ester with an organic ester of the formula

Q—X

Q and X being limited by the meanings hereinbefore assigned, and it being additionally provided that Q is not hydrogen. Quaternization takes place in the temperature range between 45 and 100°, using an inert solvent such as chloroform, acetone, butanone, or the like as reaction medium. Quaternization is ordinarily completed in from 1 to 48 hours and is generally carried out in a closed system if a lower alkyl halide—such as methyl chloride—is one of the reagents. Using methyl bromide, the manufacture of quaternary salts may be smoothly effected in butanone solution at 70°, the reaction time being approximately one hour.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade, pressures in millimeters of mercury, and relative amounts of materials in parts by weight, except as otherwise noted.

*Example 1*

5-diethylamino-3-oxapentyl m-chlorocarbanilate.—A solution of 31 parts of m-chlorophenyl isocyanate and 32 parts of 5-diethylamino-3-oxapentanol in 500 parts of anhydrous ether is heated at the boiling point under reflux for 3 hours. The solution is then extracted with 1500 parts of aqueous 5% hydrochloric acid, and the extract is made basic with a slight excess of sodium hydroxide. The resultant mixture is extracted with ether; and the ethereal extract is treated with decolorizing charcoal, filtered, and stripped of solvent by distillation. The residual oil is the desired 5-diethylamino-3-oxapentyl m-chlorocarbanilate, which has the formula

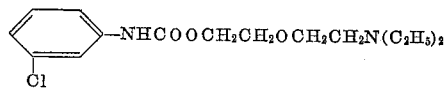

*Example 2*

5-diethylamino-3-oxapentyl p-chlorocarbanilate hydrobromide.—A solution of 156 parts of p-chlorophenyl isocyanate and 161 parts of 5-diethylamino-3-oxapentanol in 2500 parts of anhydrous ether is heated at the boiling point under reflux for 4 hours. At the end of the prescribed heating period, the reaction mixture is made just acid with ethanolic hydrogen bromide, precipitating 5-diethylamino-3-oxapentyl p-chlorocarbanilate hydrobromide as white crystals which, recrystallized from a mixture of absolute ethanol and anhydrous ether, melt at 96–99°. The product has the formula

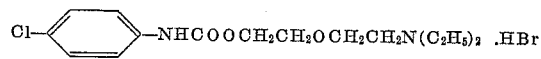

*Example 3*

5 - diethylamino - 3 - oxapentyl o-chlorocarbanilate.—Using the technique of Example 1, but substituting 31 parts of o-chlorophenyl isocyanate for the 31 parts of m-chlorophenyl isocyanate called for therein, one obtains 5-diethylamino-3-oxapentyl o-chlorocarbanilate, of the formula

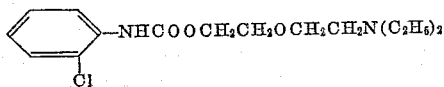

Example 4

*5-dimethylamino - 3 - oxapentyl m-chlorocarbanilate.*—Using the technique of Example 1, but substituting 27 parts of 5-dimethylamino-3-oxapentanol for the 32 parts of 5-diethylamino-3-oxapentanol called for therein, one obtains 5-dimethylamino-3-oxapentyl m-chlorocarbanilate, which has the formula

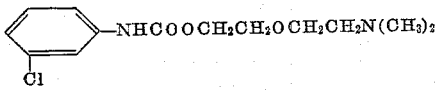

Example 5

A. *3,4,5-trimethoxyphenyl isocyanate.*—To 1000 parts of toluene at 80° is added, with vigorous agitation, a solution of 237 parts of 3,4,5-trimethoxybenzoyl azide in 2500 parts of ether at a rate such that temperatures of the toluene range between 80 and 90° while ether distils out and nitrogen is copiously evolved. The addition is ordinarily completed in approximately 1½ hours, following which the resultant solution is heated at 95° for 1 hour, vigorous agitation being continued throughout. The mixture thus obtained is distilled in vacuo, the toluene coming over first and the desired 3,4,5-trimethoxyphenyl isocyanate in the fraction boiling at 102–110°/0.4 mm. pressure. The product solidifies on standing and melts at 42–45°.

B. *5-diethylamino - 3 - oxapentyl 3,4,5-trimethoxycarbanilate.*—A solution of approximately 11 parts of 3,4,5-trimethoxyphenyl isocyanate and 8 parts of 5-diethylamino-3-oxapentanol in 250 parts of benzene is heated at the boiling point under reflux for 12 hours. The solution is then extracted with 500 parts of aqueous 5% hydrochloric acid, and the resultant extract is made basic with sodium hydroxide. The mixture thus obtained is extracted with ether; and the ether extract is treated with decolorizing charcoal, filtered, and stripped of solvent by distillation. The residual golden oil is 5-diethylamino-3-oxapentyl 3,4,5-trimethoxycarbanilate, of the formula

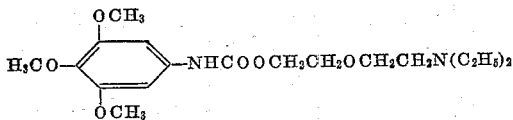

Example 6

*5-dimethylamino - 3 - oxapentyl o-ethoxycarbanilate.*—A solution of 33 parts of o-ethoxyphenyl isocyanate and 27 parts of 5-dimethylamino-3-oxapentanol in 500 parts of anhydrous ether is heated at the boiling point under reflux for 3 hours. At the end of this time, the solution is extracted with 1000 parts of aqueous 5% hydrochloric acid. The acid extract is made basic with sodium hydroxide, and the mixture thus obtained is extracted with ether. The ether extract is treated with decolorizing charcoal, filtered, and stripped of solvent by distillation. The pale yellow product which remains is 5-dimethylamino-3-oxapentyl o-ethoxycarbanilate, of the formula

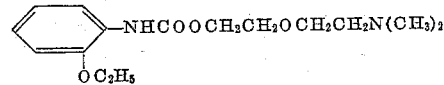

What is claimed is:
1. A compound of the formula

R—NHCOOCH$_2$CH$_2$OCH$_2$CH$_2$N(lower alkyl)$_2$ wherein R is a member of the class consisting of radicals of the formulas

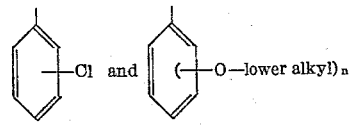

in which *n* is a positive integer less than 4.

2. A compound of the formula

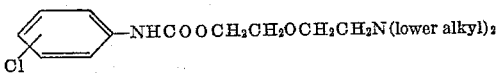

3. 5-diethylamino-3-oxapentyl m-chlorocarbanilate.
4. 5-diethylamino-3-oxapentyl p-chlorocarbanilate.
5. 5-diethylamino-3-oxapentyl o-chlorocarbanilate.
6. A compound of the formula

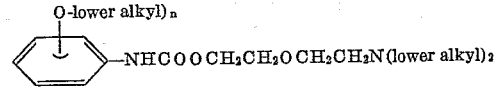

wherein *n* is a positive integer less than 4.

7. 5-diethylamino - 3 - oxapentyl 3,4,5-trimethoxycarbanilate.

References Cited in the file of this patent

UNITED STATES PATENTS

| | | |
|---|---|---|
| 2,404,588 | Martin et al. | July 23, 1946 |
| 2,423,025 | Holmes et al. | June 24, 1947 |
| 2,558,146 | Moffett | June 26, 1951 |
| 2,585,826 | Olsen | Feb. 12, 1952 |
| 2,842,585 | Morren | July 8, 1958 |
| 2,885,404 | Petrow et al. | May 5, 1959 |
| 2,948,746 | Stuehmer et al. | Aug. 9, 1960 |

FOREIGN PATENTS

| | | |
|---|---|---|
| 734,745 | Great Britain | Aug. 3, 1955 |

OTHER REFERENCES

Hutton: J. Org. Chem., 20, 855 to 859 (1955).
Epstein et al.: J. Am. Pharm. Assoc., vol. 47, pages 347–9 (1958).